(12) United States Patent
Kim

(10) Patent No.: US 8,238,006 B2
(45) Date of Patent: Aug. 7, 2012

(54) APPARATUS AND METHOD FOR DISPLAYING THREE-DIMENSIONAL IMAGES

(75) Inventor: Jideog Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 356 days.

(21) Appl. No.: 12/204,021

(22) Filed: Sep. 4, 2008

(65) Prior Publication Data

US 2009/0059339 A1 Mar. 5, 2009

(30) Foreign Application Priority Data

Sep. 4, 2007 (KR) .................. 10-2007-0089404

(51) Int. Cl.
*G02B 5/32* (2006.01)
*G03H 1/22* (2006.01)
(52) U.S. Cl. ............................ 359/17; 359/32
(58) Field of Classification Search .............. 359/17, 359/18, 32
See application file for complete search history.

(56) References Cited

U.S. PATENT DOCUMENTS

| 5,418,632 | A | | 5/1995 | Anderson |
| 5,430,560 | A | | 7/1995 | Wakai et al. |
| 5,596,442 | A | * | 1/1997 | Plesko ................... 359/199.1 |
| 5,703,860 | A | * | 12/1997 | Fukunaga et al. ........... 369/102 |
| 7,742,209 | B2 | * | 6/2010 | Curtis et al. ................ 359/10 |
| 2006/0193023 | A1 | * | 8/2006 | El Hafidi et al. ............. 359/15 |

FOREIGN PATENT DOCUMENTS

| DE | 19837425 A1 | 3/2000 |
| EP | 0758778 A2 | 2/1997 |
| JP | 8338976 | 12/1996 |
| KR | 1020030076235 A | 9/2003 |
| KR | 1020030077264 A | 10/2003 |
| KR | 1020050083548 A | 8/2005 |
| KR | 1020080071381 A | 8/2008 |

* cited by examiner

*Primary Examiner* — Jade R Chwasz
(74) *Attorney, Agent, or Firm* — Sughrue Mion, PLLC

(57) ABSTRACT

The apparatus includes a light source unit and a volume diffractive element diffracting beams emitted from the light sources unit so that spots of the beams can be formed at different positions from each other in a propagating direction of the beams diffracted by the volume diffractive element to scan the beams in a first direction.

17 Claims, 10 Drawing Sheets

$\delta_z = 0$
$\delta_y < 0$

APPARATUS AND METHOD FOR DISPLAYING THREE-DIMENSIONAL IMAGES

CROSS-REFERENCE TO RELATED PATENT APPLICATIONS

This application claims the benefit of Korean Patent Application No. 10-2007-0089404, filed on Sep. 4, 2007, in the Korean Intellectual Property Office, the disclosure of which is incorporated herein in its entirety by reference.

BACKGROUND OF THE INVENTION

1. Field of the Invention

Apparatuses and methods consistent with the invention relate to displaying three-dimensional images.

2. Description of the Related Art

Among methods of displaying three-dimensional images, a three-dimensional scanning method, a holography method, and a stereoscopy method are well known in the art. According to the holography method, an interference fringe is formed in a photosensitive material using a reference beam and an object beam that interfere with each other to form a three-dimensional image. When the reference beam is irradiated onto the three-dimensional image, the object beam is restored to display the three-dimensional image. According to the holography method, a coherent light source is required and it is difficult to record/reproduce a large object located far away. According to the stereoscopy method, two two-dimensional images having a binocular parallax are separately viewed by both eyes of a viewer, thereby making the image stereoscopic. According to the stereoscopic method, two plane images are used, and thus, it is easy to realize a three-dimensional image and to display the three-dimensional image having a high resolution. However, since the stereoscopy method only uses a horizontal parallax, it is difficult to realize a three-dimensional image having both a horizontal parallax and a vertical parallax.

On the other hand, according to the three-dimensional scanning method, a beam emitted by a light source is directly modulated in order to improve an optical efficiency and a contrast of the image. In a three-dimensional image displaying apparatus using the scanning method, the three-dimensional image can be displayed by scanning point beam in a three-dimensional manner or by scanning beam in x and y directions using a spatial light modulator and by moving a focus in a z direction. When the three-dimensional scanning method is performed using a two-dimensional spatial light modulator, the scanning can be performed at a high speed; however, fabrication costs increase. On the other hand, the point scanning method is inexpensive and requires simple equipment. Point scanning can be realized only when one-dimensional optical modulation can be performed in a propagating direction of the beam. However, it is difficult to realize one-dimensional optical modulation, and thus, point scanning cannot be widely used.

SUMMARY OF THE INVENTION

An embodiment of the present invention provides an apparatus for displaying a three-dimensional image using a volume diffractive element.

Another embodiment of the present invention provides an apparatus, which is capable of performing one-dimensional optical modulation in a propagating direction of a beam and displaying three-dimensional images by combining the one-dimensional optical modulation with a two-dimensional scanning operation.

Another embodiment of the present invention also provides a method of displaying a three-dimensional image using the volume diffractive element.

Another embodiment of the present invention provides a method of displaying a three-dimensional image by performing optical modulation in a propagating direction of the beam and performing two-dimensional scanning in a direction different from the propagating direction of the beam.

According to an aspect of the present invention, there is provided an apparatus for displaying a three-dimensional image, the apparatus comprising: a light source array comprising a plurality of light sources; a volume diffractive element diffracting beams emitted from the light sources so that spots of the beams can be formed at different positions from each other in a propagating direction of the beams diffracted by the volume diffractive element to scan the beams in a first direction; a first driving apparatus driving the light source array to scan the beams in a second direction; and a second driving apparatus driving the volume diffractive element to scan the beams in a third direction.

The light source array may have a one-dimensional arrangement structure, in which the light sources are arranged in the first direction.

The first driving apparatus and the second driving apparatus may use a resonant scanning method to scan the beams in the second and third directions, respectively.

The volume diffractive element may comprise an interference pattern formed by making an image signal beam that is to be scanned and a reference beam emitted from one of the light sources in the light source array interfere with each other.

The volume diffractive element may comprise one of a photorefractive crystal, a photorefractive polymer, and a photopolymer.

The second driving apparatus may drive the volume diffractive element in a linear direction.

The second driving apparatus may rotate the volume diffractive element around an axis corresponding to the third direction on a plane formed by the first direction and the second direction.

The apparatus may comprise a Fourier lens disposed next to the volume diffractive element, wherein the second driving apparatus simultaneously drives the volume diffractive element and the Fourier lens.

According to another aspect of the present invention, there is provided an apparatus for displaying a three-dimensional image, the apparatus comprising: a light source array comprising a plurality of light sources that are arranged in a row direction and a column direction of a two-dimensional structure; a volume diffractive element diffracting beams emitted from the light sources in the row direction in the light source array so that spots of the beams can be formed at different positions from each other in a propagating direction of the beams diffracted by the volume diffractive element and to scan the beams in a first direction, and scanning beams emitted from the light sources in the column direction of the light source array in a second direction; and a driving apparatus driving the volume diffractive element to scan the beams in a third direction.

According to another aspect of the present invention, there is provided a method of displaying a three-dimensional image, the method comprising: modulating beams emitted from a light source array comprising a plurality of light sources, according to image signals; scanning the modulated beams in a first direction by diffracting the modulated beams using a volume diffractive element so as to form spots of the beams at different positions from each other in a propagating direction of the beams diffracted by the volume diffractive element; scanning the beams in a second direction by driving the light source array; and scanning the beams in a third direction by driving the volume diffractive element.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

Hereinafter, an apparatus and method for displaying three-dimensional images according to embodiments of the present invention will be described with reference to the accompanying drawings.

Figure 1A:
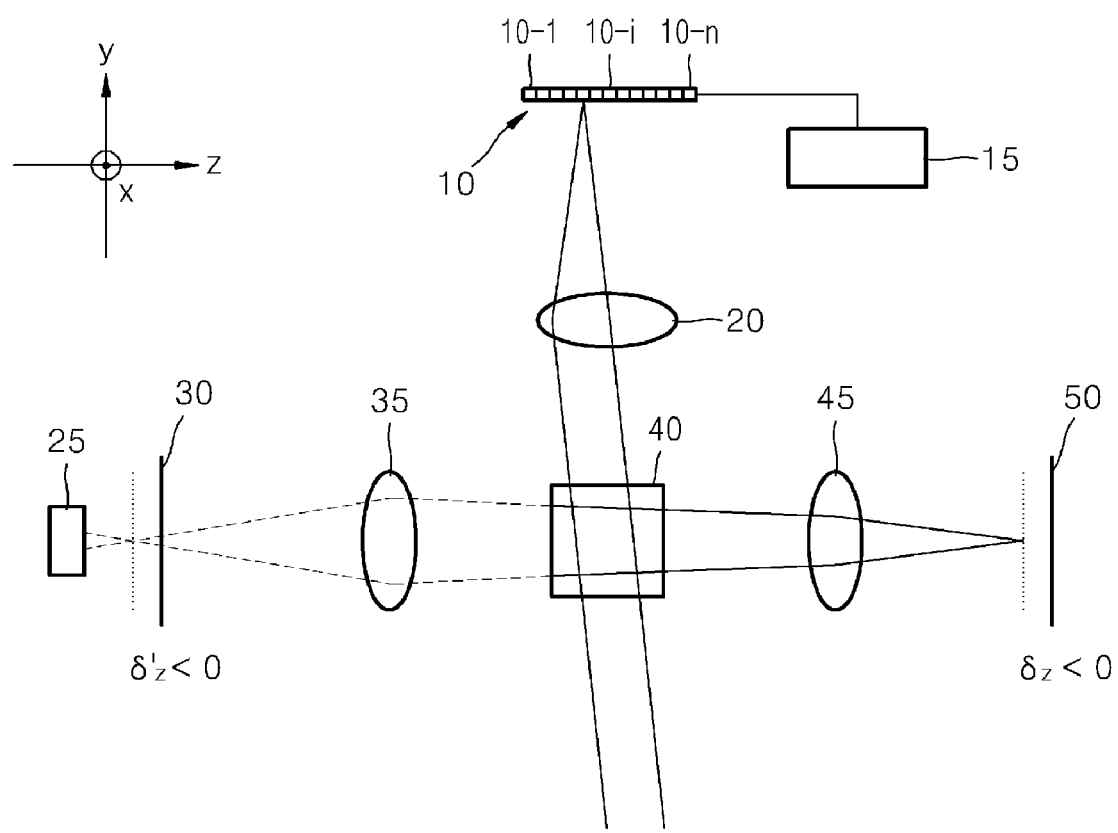
FIG. 1A is a schematic diagram illustrating a scanning operation in a z direction in a three-dimensional image display apparatus according to an embodiment of the present invention.

FIG. 1A is a schematic diagram of a three-dimensional image display apparatus according to an embodiment of the present invention. Referring to FIG. 1A, the three-dimensional image display apparatus according to the current embodiment of the present invention includes a light source array 10 including a plurality of light sources (10-1) . . . (10-i) . . . (10-n) (i and n are natural numbers, i<n), and a volume diffractive element 40 forming spots of beams emitted from the plurality of light sources (10-1) . . . (10-i) . . . (10-n) at different positions from each other in a propagating direction of the beams. According to an embodiment of the present invention, the beams are scanned in a first direction, a second direction, and a third direction in order to display a three-dimensional image. The beams emitted from the light sources (10-1) . . . (10-i) . . . (10-n) are diffracted by the volume diffractive element 40 so that the spots can be formed at different positions from each other in the propagating direction of the beams diffracted by the volume diffractive element 40, and then, the beams are scanned in the first direction. In addition, the light source array 10 is driven to scan the beams in the second direction, and the volume diffractive element 40 is driven to scan the beams in the third direction.

Here, the propagating direction of the beams diffracted by the volume diffractive element 40 is denoted as a z direction, and two directions that are perpendicular to the z direction are denoted as an x direction and a y direction, respectively. For example, the first direction can be the z direction, the second direction can be the x direction, and the third direction can be the y direction. The plurality of light sources can be arranged in a one-dimensional structure in the z direction. The beams emitted from the light source array 10 are diffracted by the volume diffractive element 40 and focused onto different spots from each other in the z direction. Therefore, turn-on and turn-off of the light sources (10-1) . . . (10-i) . . . (10-n) included in the light source array 10 are controlled to realize optical modulation in the z direction. The volume diffractive element 40 includes an interference pattern that is formed in advance, and thus, diffracts the beams from the light sources (10-1) . . . (10-i) . . . (10-n) of the light source array 10 so as to form the spots of the beams at the different positions from each other in the propagating direction of the beams diffracted by the volume diffractive element 40.

Figure 1B:
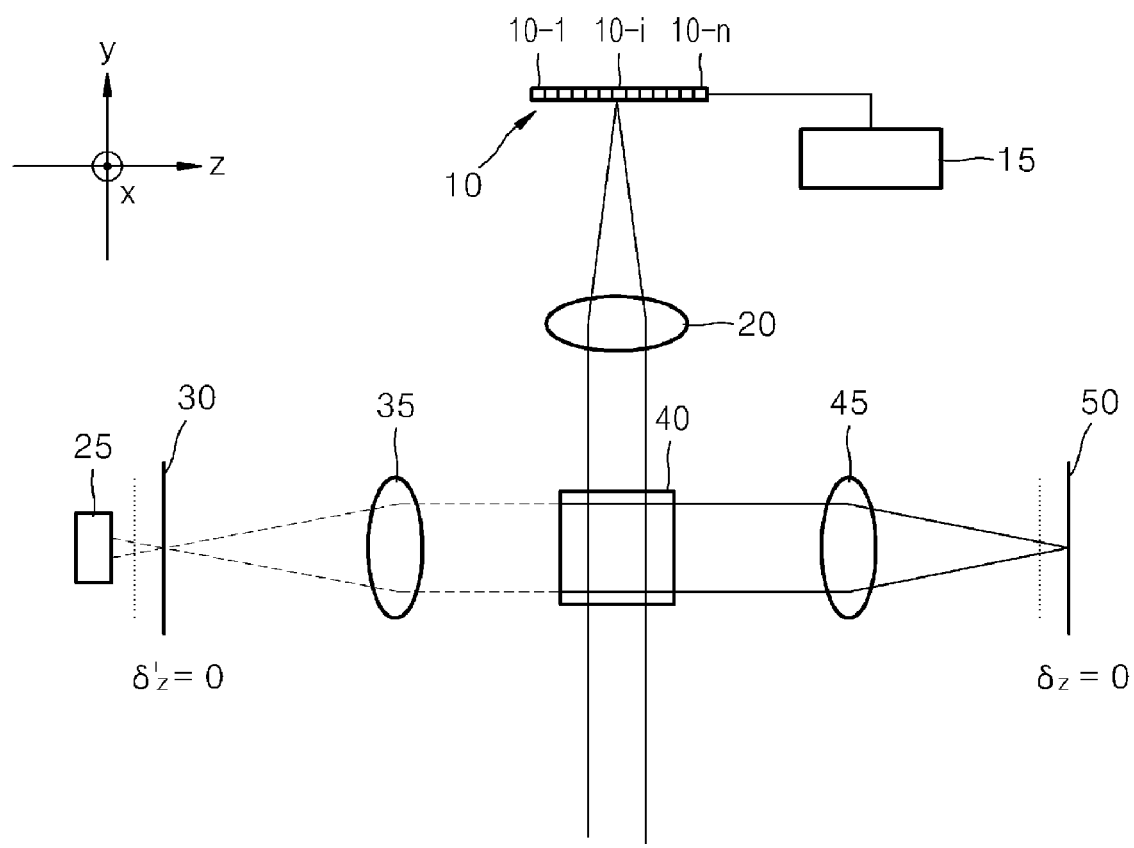
FIG. 1B is a diagram illustrating a scanning operation in a z direction in the three-dimensional image display apparatus of FIG. 1A, according to another embodiment of the present invention.
Figure 1C:
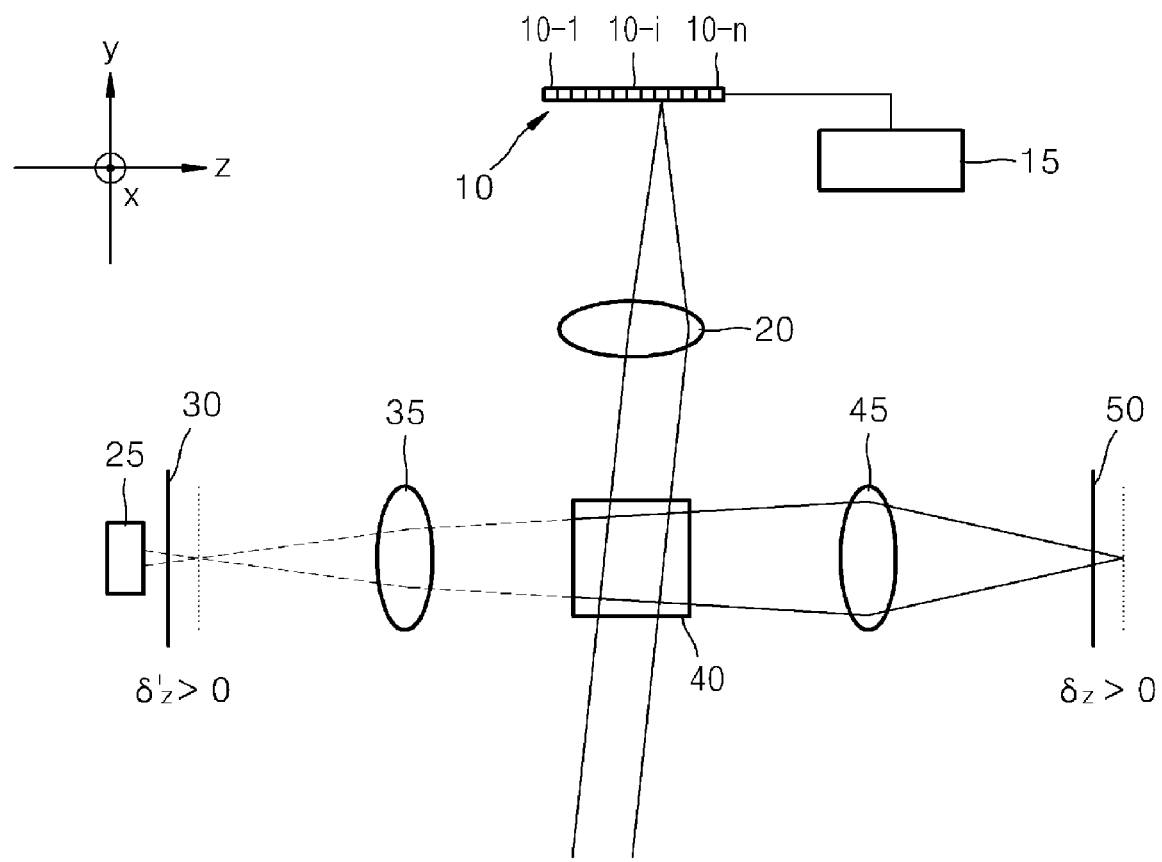
FIG. 1C is a diagram illustrating a scanning operation in a z direction in the three-dimensional image display apparatus of FIG. 1A, according to another embodiment of the present invention.

For example, FIG. 1A shows that a beam emitted from a light source that is located to the left of the center of the light source array 10 is diffracted by the volume diffractive element 40 and is focused in front of a reference screen 50. Thus, the reference screen 50 is a surface on which the beam emitted from the light source located at the center portion of the light source array 10 is focused by the volume diffractive element 40, as illustrated in FIG. 1B. If a distance from the reference screen 50 to the focused spot is $\delta z$, $\delta z<0$ is satisfied when the spot is formed in front of the reference screen 50 as illustrated in FIG. 1A, and $\delta z>0$ is satisfied when the spot is formed behind the reference screen 50 as illustrated in FIG. 1C. FIG. 1C is a diagram showing that a beam emitted from a light source that is located to the right of the center of the light source array 10 is diffracted by the volume diffractive element 40 and is focused behind the reference screen 50, $\delta z>0$.

As described above, the light sources (10-1) . . . (10-i) . . . (10-n) of the light source array 10 are controlled to be turned on or turned off to perform one-dimensional optical modulation in the propagating direction of the beams diffracted by the volume diffractive element 40.

There are many methods of forming the interference pattern in the volume diffractive element 40, one of which is as follows. Referring to FIG. 1A, a light source unit 25 that can generate object beams forming spots at different positions from each other is disposed on a first side of the volume diffractive element 40, and the light source array 10 is disposed on a second side of the volume diffractive element 40. The light source unit 25 and the light source array 10 can be disposed at right angles with each other with respect to the volume diffractive element 40. A first Fourier lens 35 can be disposed between the light source unit 25 and the volume diffractive element 40. In addition, a lens 20 can be disposed between the light source array 10 and the volume diffractive element 40. The distance between the volume diffractive element 40 and the first Fourier lens 35 can be as much as a focal distance of the first Fourier lens 35.

The beams emitted from the light source array 10 constitute reference beams, and the object beams emitted from the light source unit 25 and the reference beams emitted from the light source array 10 interfere with each other so as to record the interference pattern in the volume diffractive element 40. The interference patterns are formed in the volume diffractive element 40 while changing the position of the spot formed by a beam emitted from the light source unit 25 and turning on/off the light sources (10-1) . . . (10-i) . . . (10-n) in the light source array 10. For example, the spot of a beam emitted from the light source unit 25 can be focused in front of a predetermined reference surface 30 (FIG. 1A), can be focused on the reference surface 30 (FIG. 1B), or can be focused behind the reference surface 30 (FIG. 1C). Then, one of the light sources (10-1) . . . (10-i) . . . (10-n) of the light source array 10 is turned on, a reference beam is irradiated by the light source onto the volume diffractive element 40, and then, the interference pattern is recorded onto the volume diffractive element 40. When it is assumed that the position of the light source unit 25 emitting an object beam forming a spot on the reference surface 30 is a reference position, the light source unit 25 is moved as much as $\delta'z(\delta'z<0)$ from the reference surface 30 to the left, and the object beam emitted from the light source unit 25 and the reference beam emitted from the light source array 10 interfere with each other, and then, the interference signal of the object and reference beams is recorded onto the volume diffractive element 40. Here, the object and reference beams should maintain the property of mutual coherence.

Referring to FIGS. 1A through 1C respectively, a first interference pattern formed by the spot formed at the position of $\delta'z<0$ and a first reference beam corresponding to the spot, a second interference pattern formed by the spot formed at a position of $\delta'z=0$ and a second reference beam corresponding to the spot, and a third interference pattern formed by the spot formed at a position of $\delta'z>0$ and a third reference beam corresponding to the spot can be recorded onto the volume diffractive element 40. The above-described method of forming interference patterns on the volume diffractive element 40 is merely an example, and interference patterns on the volume diffractive element 40 can be formed using various methods.

The volume diffractive element 40 can be a volume diffractive element, and can include, for example, one of a photorefractive crystal, a photorefractive polymer, and a photopolymer. When a reference beam is irradiated onto the volume diffractive element 40, on which the interference patterns were formed, the corresponding object beam is reproduced. That is, when one of the light sources (10-1) . . . (10-i) . . . (10-n) in the light source array 10 irradiates a reference beam onto the volume diffractive element 40, the object beam corresponding to that light source is diffracted by the volume diffractive element 40 and reproduced. When all of the light sources (10-1) . . . (10-i) . . . (10-n) in the light source array 10 are turned on, the reference beams emitted from the light source array 10 are diffracted by the volume diffractive element 40 to form spots at different positions from each other in the propagating direction (z direction) of the beams diffracted by the volume diffractive element 40. When the light source of the first reference beam is turned on, the first reference beam is diffracted by the volume diffractive element 40 and reproduced at the position of $\delta z<0$ as illustrated in FIG. 1A. When the light source of the second reference beam is turned on, the beam is reproduced at the position of $\delta z=0$ as illustrated in FIG. 1B. When the light source of the third reference beam is turned on, the beam is reproduced at the position of $\delta z>0$ as illustrated in FIG. 1C. As described above, direct optical modulation in the propagating direction of the beams diffracted by the volume diffractive element 40 can be performed by turning on/off the light sources (10-1) . . . (10-i) . . . (10-n) in the light source array 10. Therefore, one-dimensional scanning in the propagating direction of the beams diffracted by the volume diffractive element 40 can be performed. In the present invention, a distance between neighboring light sources in the light source array 10 can be determined according to the characteristic of the volume diffractive element 40 so that the focuses of which are located on the z axis have no cross-talk when the beams are incident onto the volume diffractive element 40 simultaneously. When the minimum angle for the multiplexing of the beam diffracted by the volume diffractive element 40 propagating in the z direction is $\Delta\theta$, the minimum distance between the light sources $\Delta z$ can be determined as $\Delta z=f\Delta\theta$. Here, $f$ denotes the focal distance of the lens 20.

On the other hand, a second Fourier lens 45 can be further disposed next to the volume diffractive element 40. The second Fourier lens 45 focuses the signal beam diffracted by the volume diffractive element 40.

Figure 2A:
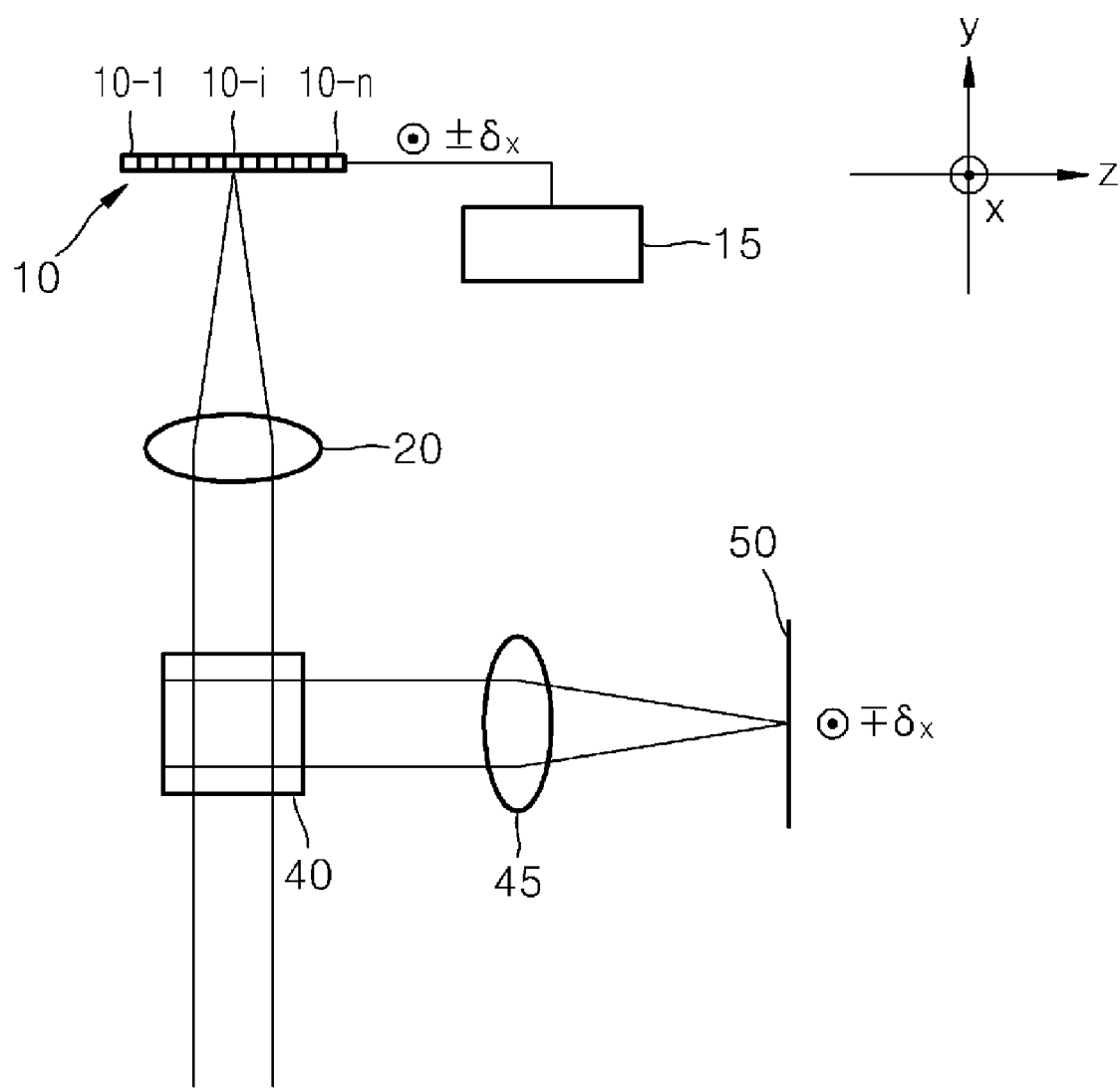
FIG. 2A is a diagram illustrating a scanning operation in an x direction in the three-dimensional image display apparatus of FIG. 1A, according to an embodiment of the present invention.
Figure 2B:
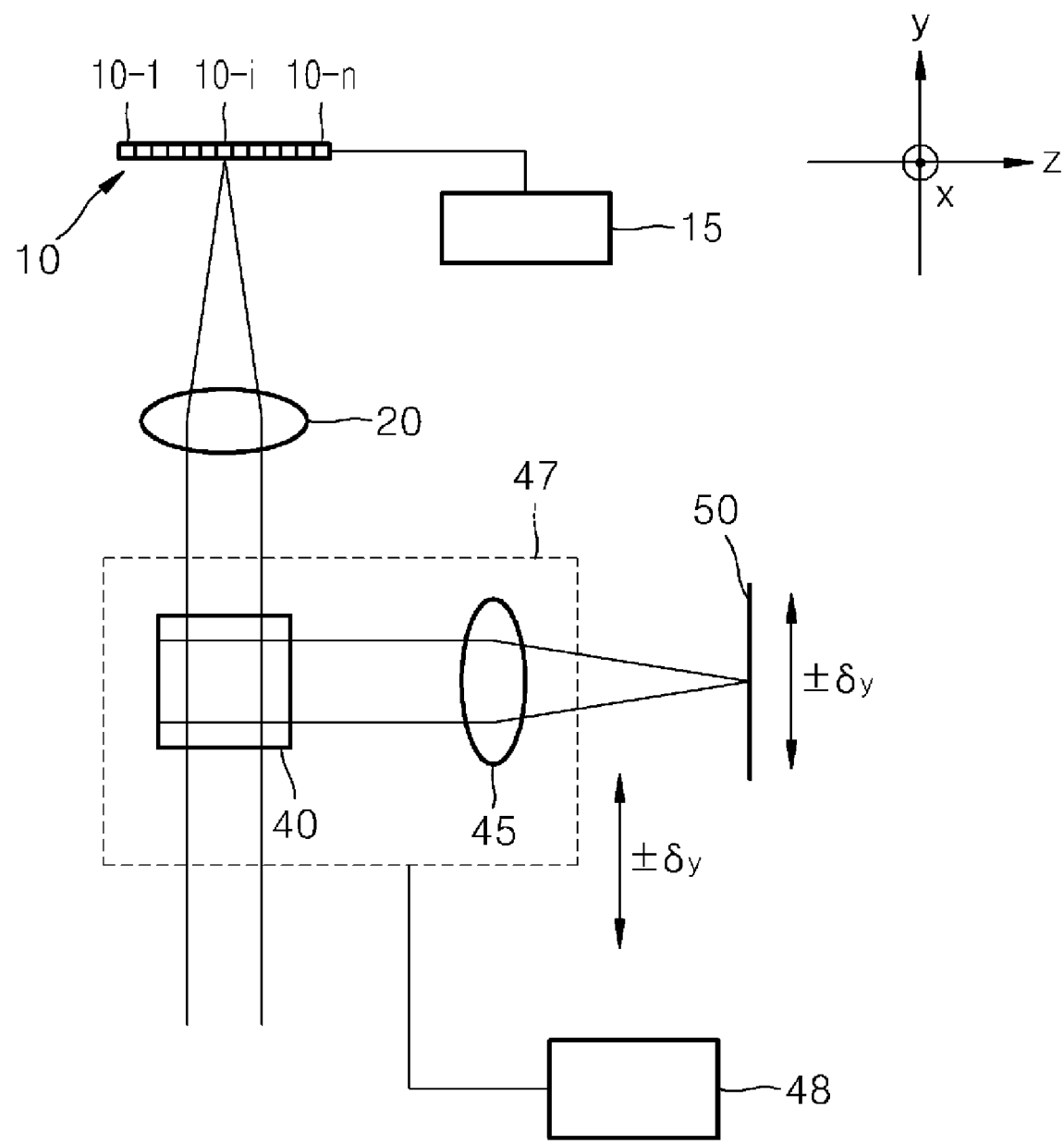
FIG. 2B is a diagram illustrating a scanning operation in a y direction in the three-dimensional image display apparatus of FIG. 1A, according to another embodiment of the present invention.

According to the present invention, the focus spots of the image signal beams are formed at different positions from each other in the propagating direction of the beams diffracted by the volume diffractive element 40 according to the positions of light sources in the light source array, and thus, one-dimensional optical modulation can be performed. In the present invention, one-dimensional optical modulation can be realized coaxially with the propagating direction of the beams diffracted by the volume diffractive element 40, and then, a two-dimensional scanning operation is combined with the one-dimensional optical modulation to realize a three-dimensional image display. That is, the beam is scanned in two directions that are perpendicular to the propagating direction (z direction) of the beam diffracted by the volume diffractive element 40, that is, x and y directions. FIG. 2A is a diagram illustrating a scanning operation in an x direction in the three-dimensional image display apparatus of FIG. 1A, according to an embodiment of the present invention. Referring to FIG. 2A and 2B, the three-dimensional image display apparatus according to the present invention includes a first driving apparatus 15 driving the light source array 10 and a second driving apparatus 48 driving the volume diffractive element 40. The first driving apparatus 15 drives the light source array 10 in ±x directions to scan the beams emitted from the light source array 10 in the x direction. When the light source array 10 is moved as much as ±δx in the x direction, the beam diffracted by the volume diffractive element 40 is scanned in the x direction. FIG. 2B is a diagram illustrating a scanning operation in a y direction in the three-dimensional image display apparatus of FIG. 1A, according to another embodiment of the present invention. Referring to FIG. 2B, the volume diffractive element 40 is driven in ±y directions to scan the beams emitted from the light source array 10 in the y direction. When the volume diffractive element 40 is moved as much as ±δy in the y direction, the beam diffracted by the volume diffractive element 40 is scanned in the y direction. When scanning in the y direction is performed, the volume diffractive element 40 can be driven in the y direction or a module 47 including the volume diffractive element 40 and the second Fourier lens 45 can be driven in the y direction.

Referring to FIG. 2B, when the module 47 including the volume diffractive element 40 and the second Fourier lens 45 is moved as much as δy in the y direction by the second driving apparatus 48, the spot of the beam is also moved in the y direction. When the light source array 10 and the volume diffractive element 40 are driven in the x direction and the y direction respectively, a resonant scanning method can be used. The beams from the light source array 10 are modulated while resonantly scanning the module 47 including the volume diffractive element 40 and the second Fourier lens 45 and the light source array 10 so that the three-dimensional images can be displayed.

Figure 3A:
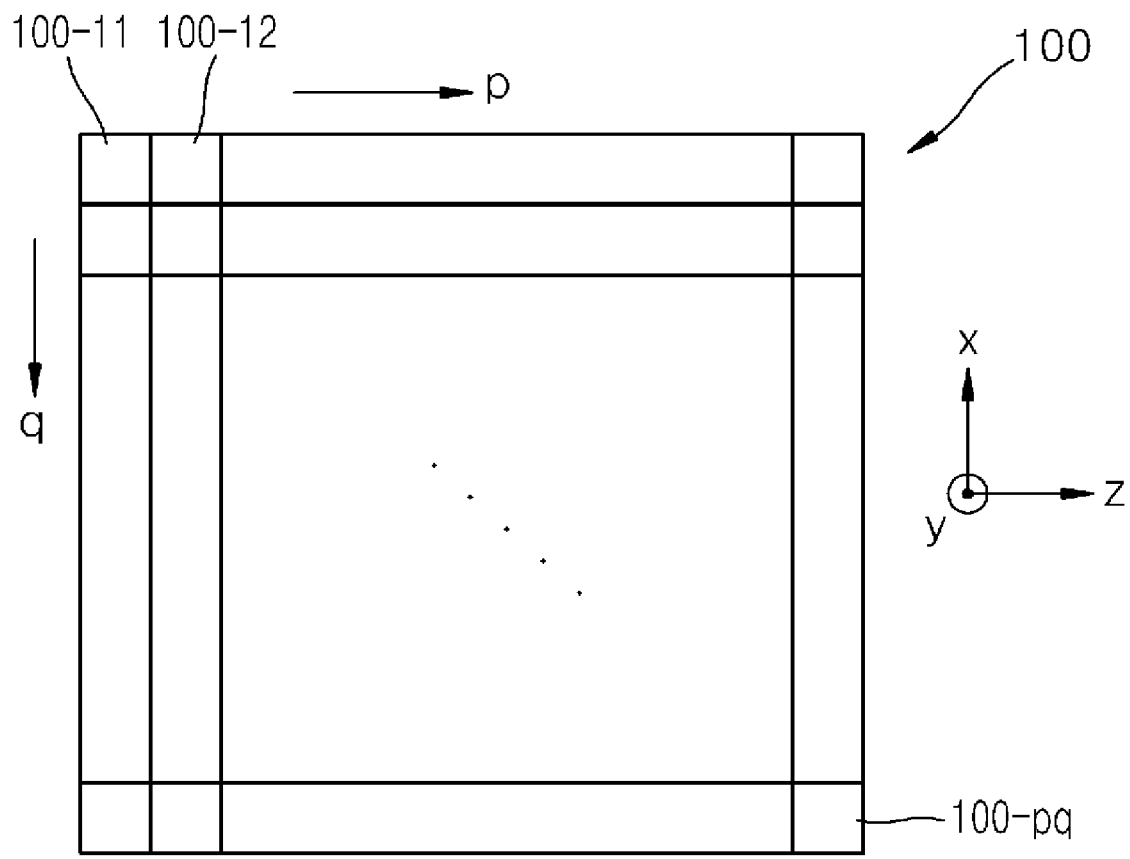
FIG. 3A is a diagram of a two-dimensional light source array adopted in the three-dimensional image display apparatus of FIG. 1A, according to an embodiment of the present invention.
Figure 3B:
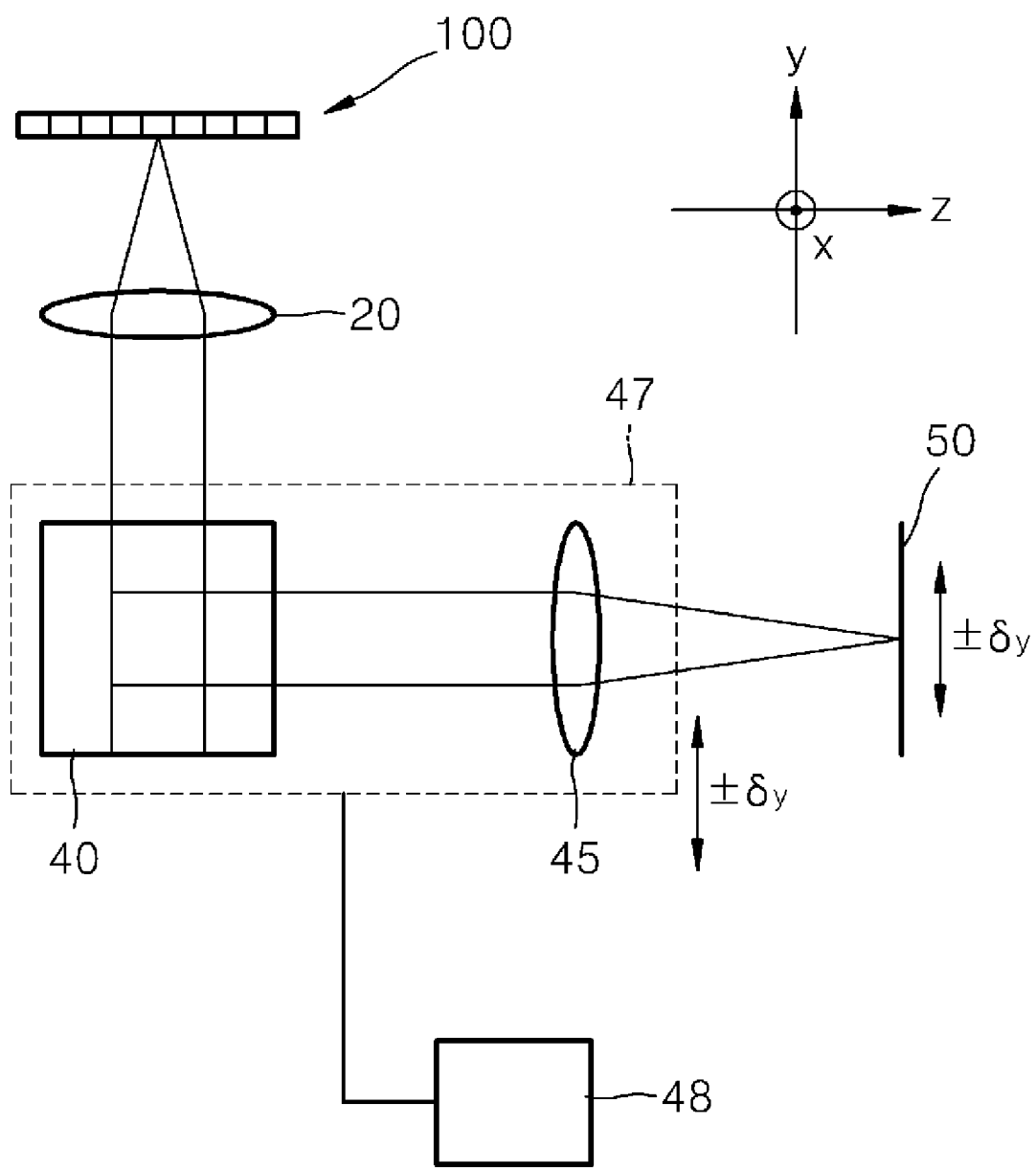
FIG. 3B is a diagram illustrating operations of a three-dimensional image display apparatus including the two-dimensional light source array illustrated in FIG. 3A, according to an embodiment of the present invention.

In FIGS. 2A and 2B, the light source array 10 is formed to have a one-dimensional structure; however, the present invention is not limited thereto, and the light source array 10 can have a two-dimensional structure as shown in FIG. 3A. Referring to FIG. 3A, the light source array 100 includes a plurality of light sources (100-11)(100-12) . . . (100-pq) that are arranged in a row direction (p) and a column direction (q). FIG. 3B is a diagram illustrating operations of a three-dimensional image display apparatus including the two-dimensional light source array 100 illustrated in FIG. 3A, according to an embodiment of the present invention. The same reference numerals in the drawings denote the same elements, and thus detailed descriptions thereof will not be repeated. Referring to FIG. 3B, the three-dimensional display apparatus including the two-dimensional light source array 100 according to the current embodiment of the present invention controls a scanning operation in the x direction by turning on/off the light sources in the column direction (x direction) in the light source array 100. In addition, the scanning operation in the z direction is performed by turning on/off the light sources arranged in the row direction (z direction) in the light source array 100. In addition, a scanning operation in the y direction is performed by moving the volume diffractive element 40 or the module 47 including the volume diffractive element 40 and the second Fourier lens 45 in ±y directions using the second driving apparatus 48.

Figure 4A:
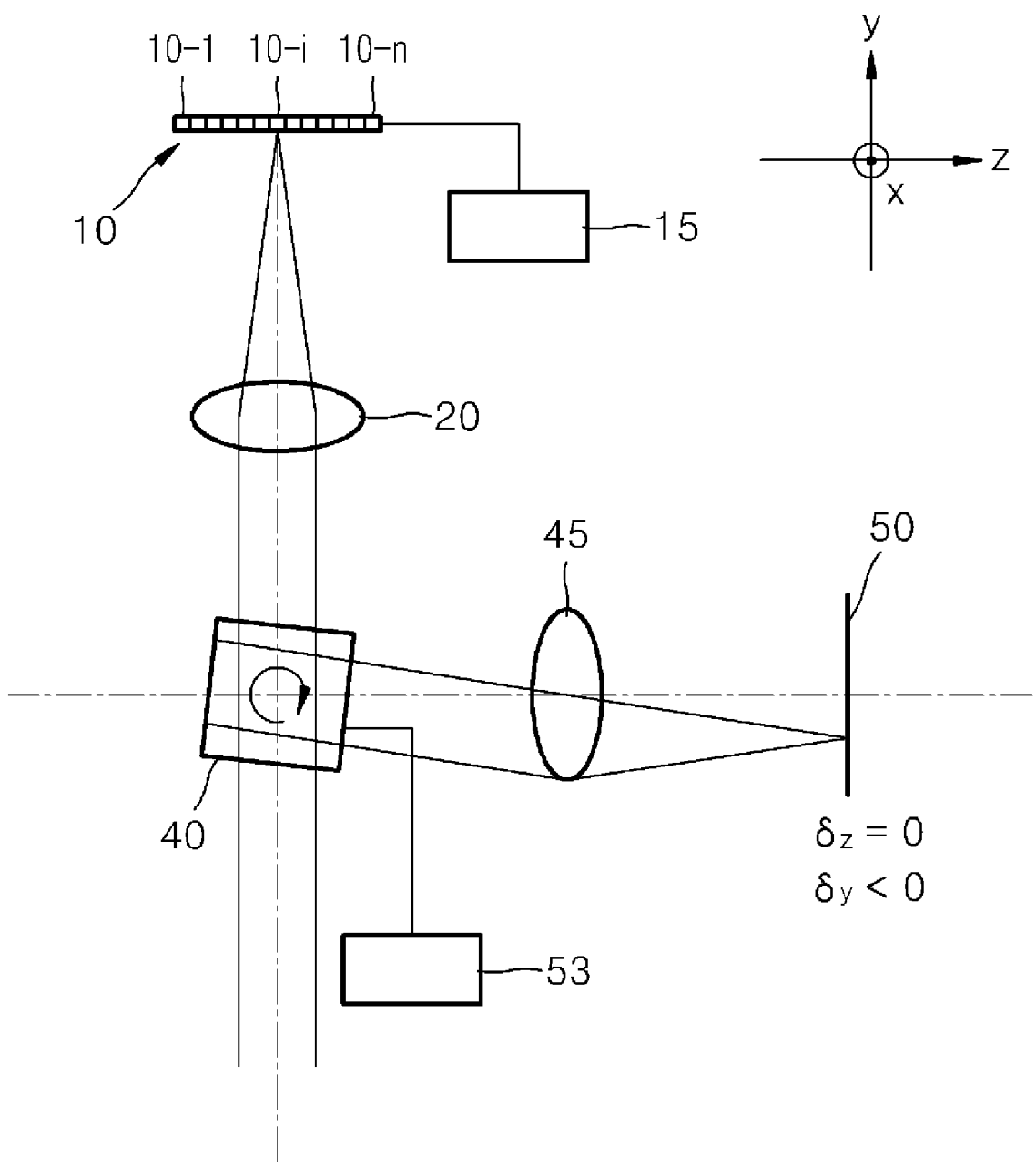
FIGS. 4A through 4C are diagrams illustrating a scanning operation in a y direction in a three-dimensional image display apparatus according to another embodiment of the present invention.
Figure 4B:
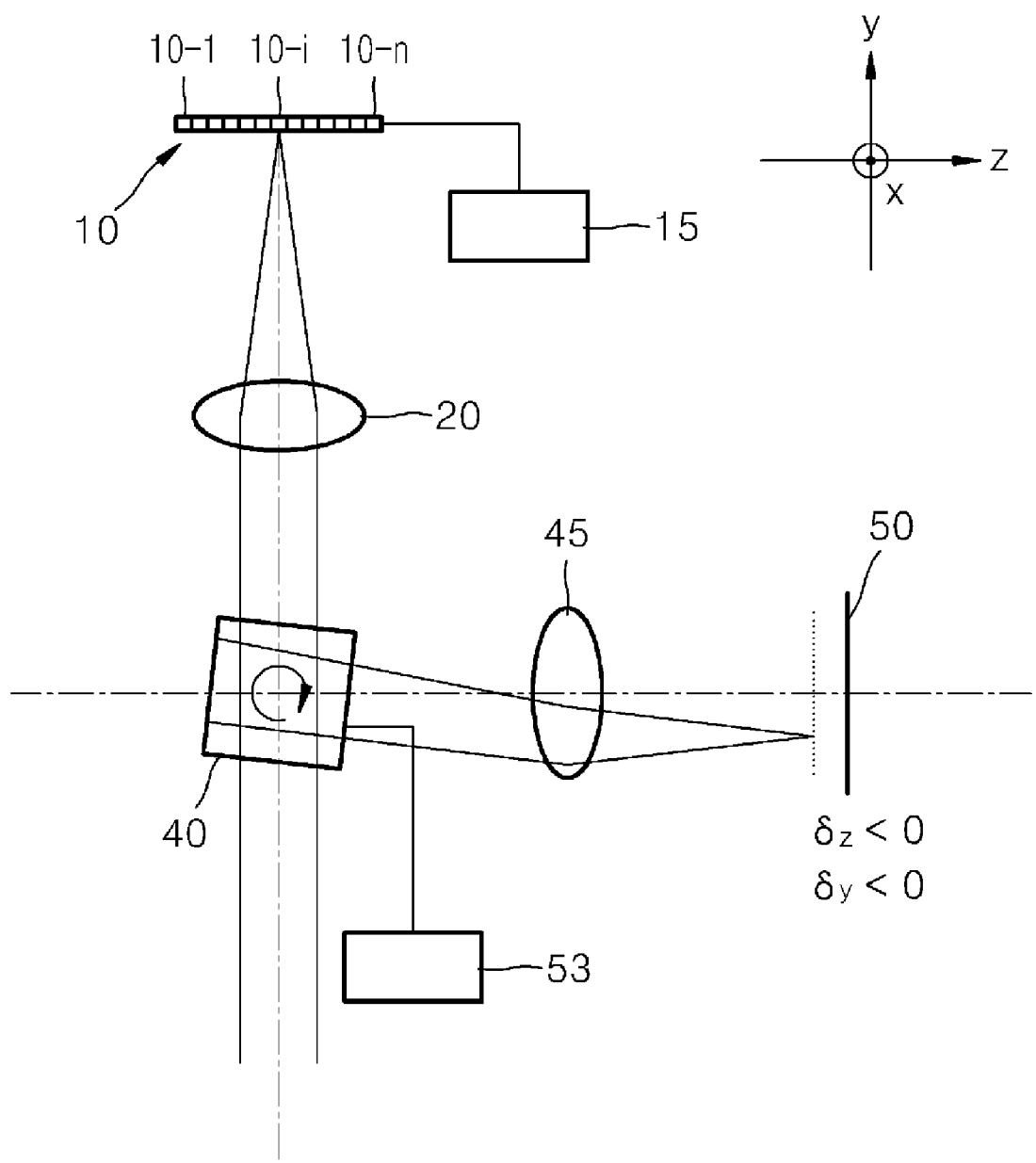
Figure 4C:
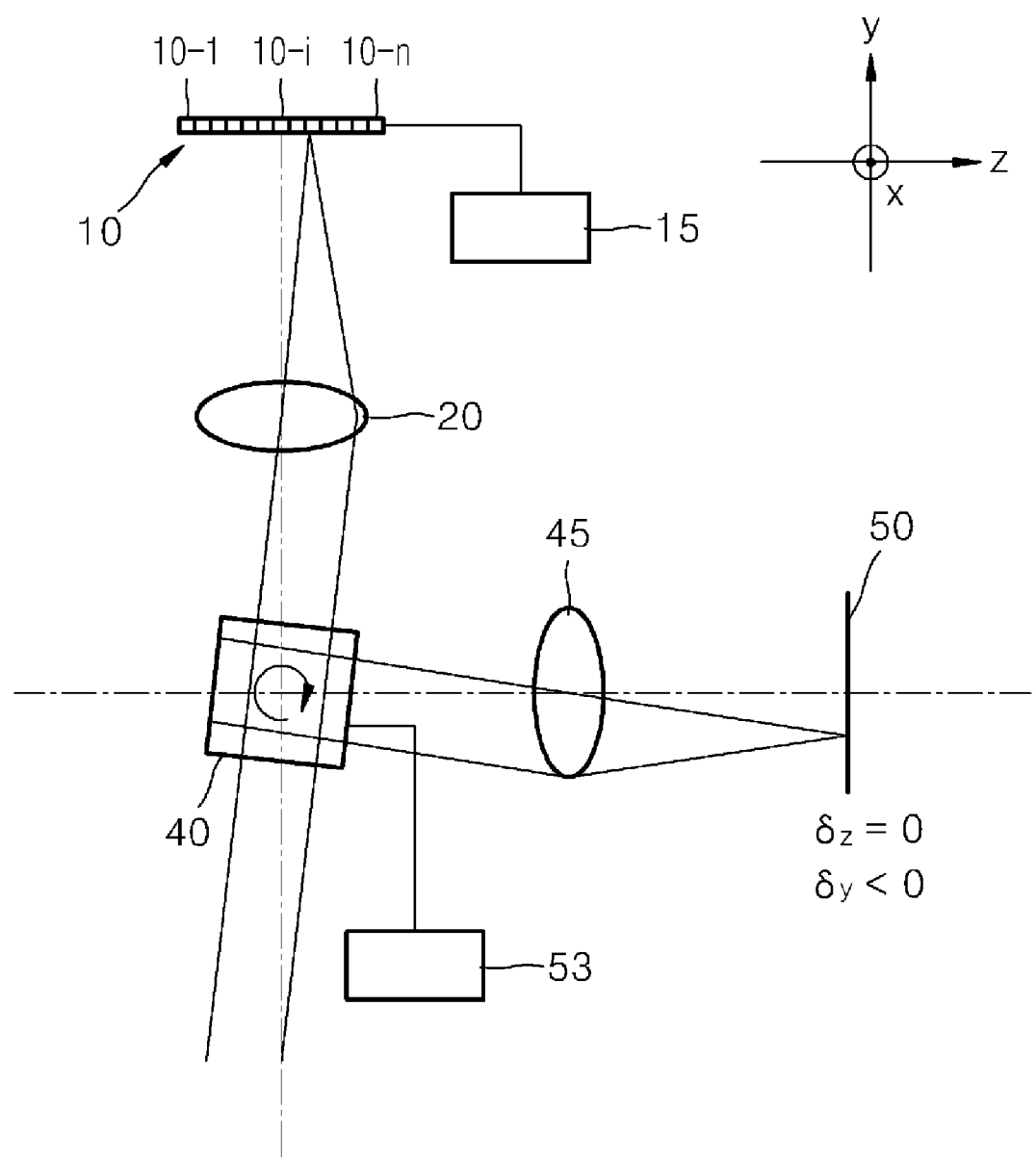

FIGS. 4A through 4C are diagrams illustrating a scanning operation in a y direction in a three-dimensional image display apparatus according to another embodiment of the present invention. The same reference numerals in the drawings denote the same elements, and thus detailed descriptions thereof will not be repeated. Referring to FIGS. 4A through 4C, scanning in the x direction is performed by driving the light source array 10 in ±x directions using the first driving apparatus 15. In addition, the beam in the z direction is directly modulated by turning on/off the light sources in the light source array 10. Next, the volume diffractive element 40 is rotated using a second driving apparatus 53 to perform the scanning operation in the y direction. The volume diffractive element 40 is rotated around the x-axis on a y-z plane. Referring to FIG. 4A, in a case in which a reference beam is emitted from a reference point of the light source array 10 and the volume diffractive element 40 is rotated in a clockwise direction with respect to FIG. 4A, the propagating direction of the beam diffracted by the volume diffractive element 40 is changed according to the rotation of the volume diffractive element 40, so that the position of the spot of the beam satisfies $\delta z=0$ and $\delta y<0$. However, referring to FIG. 4B, when the volume diffractive element 40 is rotated, an incident angle of the beam irradiated from the light source array 10 onto the volume diffractive element 40 after passing through the lens 20 is changed, and thus, the spot of the beam is substantially formed at a position satisfying $\delta z<0$ and $\delta y<0$. Therefore, referring to FIG. 4C, in order to perform the scanning operation only in the y direction, the position of the reference beam of the light source array 10 should be compensated according to the rotation angle of the volume diffractive element 40. That is, the location of the light source that is turned on is moved to the right of the reference point of the light source array 10 so that $\delta z=0$ can be satisfied.

Color images can also be displayed using a three-dimensional image display apparatus according to the present invention. An interference pattern can be formed on a volume diffractive element of the three-dimensional image display apparatus by changing wavelengths of light sources of the three-dimensional image display apparatus, and then, the light sources of different wavelengths are disposed next to each other in the light source array. In addition, the volume diffractive element is designed to selectively diffract the beams emitted from the light sources according to wavelengths of the beams. For example, in a light source array including red (R), green (G), and blue (B) light sources formed sequentially, the R light source is turned on to display an R image, the G light source is turned on to display a G image, and the B light source is turned on to display a B image so that a color image can be displayed by mixing the R, G, and B images. The scanning of each of the R, G, and B color images is performed by scanning the beams in the x, y, and z directions.

In a method of displaying a three-dimensional image according to an embodiment of the present invention, the light source array including the plurality of light sources is turned on/off according to image signals to modulate the beams, and the modulated beams are diffracted by the volume diffractive element so as to form the spots of the beams on different positions from each other in the propagating direction of the beams, and then, the beams are scanned in the first direction (z direction). In addition, the light source array is driven to scan the beams in the second direction (x direction), and the volume diffractive element 40 is driven to scan the beams in the third direction y direction. The light source array can be driven in the second direction in order to perform the scanning operation in the second direction. Otherwise, the light sources in the light source array are arranged in a two-dimensional structure, that is, in a row direction and a column direction, and thus, the light sources in the row direction are turned on/off to scan the beams in the first direction and the light sources in the column direction are turned on/off to scan the beams in the second direction.

Also, the volume diffractive element can be driven linearly in the third direction or can be rotated based on the second direction in order to scan the beams in the third direction.

According to the apparatus and method for displaying three-dimensional images of the present invention, spots of beams are formed at different positions from each other coaxially with the propagating direction of the beams according to positions of light sources in a light source array, and thus, optical modulation can be performed in the propagating direction of the beams. Therefore, three-dimensional images can be displayed easily by combining the optical modulation in the propagating direction of the beams and two-dimensional scanning. The scanning of the beam in the two directions that are perpendicular to the propagating direction of the beam can be performed separately, and thus, a wide bandwidth can be obtained when a moving picture is reproduced. As described above, optical efficiency and contrast of the image can be improved by directly modulating the beams from the light sources, and a relatively small and inexpensive three-dimensional image display apparatus can be provided.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for displaying a three-dimensional image, the apparatus comprising:
   a light source array comprising a plurality of light sources arranged in a first direction in a one-dimensional structure;
   a volume diffractive element which diffracts beams emitted from the plurality of light sources so that spots of the beams are formed at positions different from each other in a propagating direction of the beams diffracted by the volume diffractive element to scan the beams in the first direction;
   a first driving apparatus which drives the light source array in a second direction to scan the beams in the second direction; and
   a second driving apparatus which drives the volume diffractive element to scan the beams in a third direction.

2. The apparatus of claim 1, wherein the first driving apparatus and the second driving apparatus use resonant scanning to scan the beams in the second and third directions, respectively.

3. The apparatus of claim 1, wherein the volume diffractive element comprises an interference pattern formed by an interference between an image signal beam that is to be scanned and a reference beam emitted from one of the plurality of light sources in the light source array.

4. The apparatus of claim 1, wherein the volume diffractive element comprises one of a photorefractive crystal, a photorefractive polymer, and a photopolymer.

5. The apparatus of claim 1, wherein the second driving apparatus drives the volume diffractive element in a linear direction.

6. The apparatus of claim 1, wherein the second driving apparatus rotates the volume diffractive element around an axis corresponding to the third direction on a plane formed by the first direction and the second direction.

7. The apparatus of claim 1, further comprising: a Fourier lens disposed next to the volume diffractive element, wherein the second driving apparatus simultaneously drives the volume diffractive element and the Fourier lens.

8. An apparatus for displaying a three-dimensional image, the apparatus comprising:
   a light source array comprising a plurality of light sources that are arranged in a row direction and a column direction of a two-dimensional structure;
   a volume diffractive element which diffracts beams emitted from the plurality of light sources in the row direction in the light source array so that focus spots of the beams are formed at positions different from each other in a propagating direction of the beams diffracted by the volume diffractive element and to scan the beams in a first direction, and scanning beams emitted from the light sources in the column direction of the light source array in a second direction; and
   a driving apparatus which drives the volume diffractive element to scan the beams in a third direction.

9. The apparatus of claim 8, wherein the volume diffractive element comprises an interference pattern that is formed by interference between an image signal beam that is to be scanned and a reference beam from a light source of the light source array.

10. The apparatus of claim 8, wherein the volume diffractive element comprises one of a photorefractive crystal, a photorefractive polymer, and a photopolymer.

11. The apparatus of claim 8, wherein the driving apparatus drives the volume diffractive element in a linear direction.

12. The apparatus of claim 8, wherein the driving apparatus rotates the volume diffractive element around an axis corresponding to the third direction on a plane formed by the first direction and the second direction.

13. A method of displaying a three-dimensional image, the method comprising:
   modulating beams emitted from a light source array comprising a plurality of light sources, according to image signals;
   scanning the modulated beams in a first direction by diffracting the modulated beams using a volume diffractive element so as to form focus spots of the beams at positions different from each other in a propagating direction of the beams diffracted by the volume diffractive element;
   scanning the beams in a second direction by driving the light source array; and
   scanning the beams in a third direction by driving the volume diffractive element.

14. The method of claim 13, further comprising:
   forming an interference pattern on the volume diffractive element by an interference between an image signal beam that is to be scanned and a reference beam emitted from a light source in the light source array.

15. The method of claim 13, wherein the scanning of the beam in the third direction comprises:
   driving the volume diffractive element in a linear direction.

16. The method of claim 13, wherein the scanning of the beam in the third direction comprises:
   rotating the volume diffractive element around an axis corresponding to the third direction on a plane formed by the first direction and the second direction.

17. The method of claim 13, wherein the scanning of the beam in the second direction and the scanning of the beam in the third direction are performed using a resonant scanning method.

* * * * *